United States Patent
Suzuki et al.

(10) Patent No.: US 7,793,955 B2
(45) Date of Patent: Sep. 14, 2010

(54) SUSPENSION DEVICE FOR VEHICLE

(75) Inventors: Takuma Suzuki, Ichikawa (JP); Tadashi Tamasho, Fujisawa (JP); Yutaka Mikuriya, Yokosuka (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 216 days.

(21) Appl. No.: 11/995,245

(22) PCT Filed: Jun. 12, 2006

(86) PCT No.: PCT/JP2006/311750
§ 371 (c)(1),
(2), (4) Date: Jan. 10, 2008

(87) PCT Pub. No.: WO2007/007501
PCT Pub. Date: Jan. 18, 2007

(65) Prior Publication Data
US 2009/0256321 A1   Oct. 15, 2009

(30) Foreign Application Priority Data
Jul. 12, 2005   (JP) ............................. 2005-203648

(51) Int. Cl.
*B60G 3/18* (2006.01)
*B60G 3/20* (2006.01)

(52) U.S. Cl. .................. 280/124.135; 280/86.751; 280/86.75

(58) Field of Classification Search .......... 280/124.135, 280/124.136, 86.75, 86.751
See application file for complete search history.

(56) References Cited

U.S. PATENT DOCUMENTS
3,942,815 A    3/1976  Schwenk et al.
4,632,413 A *  12/1986 Fujita et al. ........... 280/124.103

(Continued)

FOREIGN PATENT DOCUMENTS
DE    41 02 313 A1    7/1992

(Continued)

*Primary Examiner*—Paul N Dickson
*Assistant Examiner*—Nicole Verley
(74) *Attorney, Agent, or Firm*—Foley & Lardner LLP

(57) ABSTRACT

To control a camber angle to an adequate value by the use of a lateral force acting on a wheel, without causing a displacement of a tire ground contact point.

A suspension device includes a link mechanism replaceable by a first virtual link 11 which, when a lateral force acts at a tire ground contact point, inclines a wheel in a camber angle direction with respect to a vehicle body so as to increase the lateral force, and a second virtual link 12 which is connected virtually and rotatably between the first virtual link 11 and the vehicle body 1 and which is arranged to allow the wheel 2 to move in the up-and-down direction with respect to the vehicle body 1 in accordance with a load variation of the wheel in the up-and-down direction. A rotation center A in the camber angle direction and a rotation center B in the up-and-down direction, of the wheel with respect to the vehicle body are arranged so that a lateral movement amount of the tire ground contact point due to a change in the position of the first virtual link 11 is canceled by a lateral movement amount of the tire ground contact point due to a change in the position of the second virtual link 12.

17 Claims, 7 Drawing Sheets

U.S. PATENT DOCUMENTS

| | | | | |
|---|---|---|---|---|
| 4,842,297 A * | 6/1989 | Takahashi | ............ | 280/124.136 |
| 5,058,918 A * | 10/1991 | Nakaya et al. | ........ | 280/124.136 |
| 5,094,472 A * | 3/1992 | Oyama et al. | .......... | 280/86.751 |
| 5,114,176 A * | 5/1992 | Sawai | .................. | 280/124.135 |
| 5,284,353 A * | 2/1994 | Shinji et al. | ............ | 280/86.751 |
| 5,431,429 A * | 7/1995 | Lee | ..................... | 280/124.139 |
| 5,451,073 A * | 9/1995 | Inoue | ................ | 280/124.145 |
| 5,620,199 A | 4/1997 | Lee | | |
| 5,692,767 A | 12/1997 | Kato | | |
| 5,697,633 A * | 12/1997 | Lee | ..................... | 280/124.136 |
| 5,704,632 A * | 1/1998 | Lee | ..................... | 280/124.128 |
| 5,851,016 A * | 12/1998 | Kawagoe et al. | ...... | 280/124.148 |
| 6,039,337 A * | 3/2000 | Urbach | ................ | 280/124.135 |
| 6,102,419 A * | 8/2000 | Chun | .................. | 280/124.135 |
| 6,113,120 A * | 9/2000 | Heap | .................. | 280/124.135 |
| 6,123,351 A * | 9/2000 | Bruehl | ................ | 280/124.135 |
| 6,203,043 B1 * | 3/2001 | Lehman | ................... | 280/288.1 |
| 6,305,700 B1 * | 10/2001 | Bruehl | ................ | 280/124.135 |
| 6,467,783 B1 * | 10/2002 | Blondelet et al. | ..... | 280/124.106 |
| 6,688,620 B2 * | 2/2004 | Serra et al. | ............ | 280/124.135 |
| 6,695,329 B2 * | 2/2004 | Handa | ................ | 280/124.135 |
| 6,793,228 B2 * | 9/2004 | Zadok | ................ | 280/124.134 |
| 7,152,867 B2 * | 12/2006 | Lemineur et al. | ...... | 280/86.751 |
| 7,219,909 B2 * | 5/2007 | Furutani et al. | ....... | 280/124.155 |
| 7,222,863 B2 * | 5/2007 | Deal et al. | ............... | 280/5.521 |
| 7,357,400 B2 * | 4/2008 | Serra | ..................... | 280/86.751 |
| 7,591,337 B2 * | 9/2009 | Suhre et al. | .................. | 180/210 |
| 2002/0125674 A1 * | 9/2002 | Walker | ................. | 280/124.106 |
| 2003/0011157 A1 | 1/2003 | Aubarede et al. | | |
| 2003/0071430 A1 | 4/2003 | Serra et al. | | |
| 2005/0051976 A1 | 3/2005 | Blondelet et al. | | |
| 2006/0138741 A1 * | 6/2006 | Dare-Bryan | ......... | 280/124.135 |
| 2006/0220338 A1 * | 10/2006 | Orimoto et al. | ....... | 280/124.141 |
| 2006/0244235 A1 * | 11/2006 | Kusaka et al. | ........ | 280/124.136 |
| 2007/0114747 A1 * | 5/2007 | Morgan | ............... | 280/124.135 |
| 2009/0026725 A1 * | 1/2009 | Haeusler et al. | ........ | 280/124.135 |

FOREIGN PATENT DOCUMENTS

| | | |
|---|---|---|
| DE | 102 47 663 A1 | 4/2004 |
| FR | 2 806 693 A1 | 9/2001 |
| FR | 2 819 752 A1 | 7/2002 |
| FR | 2 833 233 A1 | 6/2003 |
| JP | 2-306808 A | 12/1990 |
| JP | 6-156034 A | 6/1994 |
| JP | 2931670 B2 | 5/1999 |
| JP | 3085117 B2 | 7/2000 |
| JP | 2003-118338 A | 4/2003 |
| JP | 2003-528771 A | 9/2003 |
| WO | WO 2004/052666 A1 | 6/2004 |

* cited by examiner

SUSPENSION DEVICE FOR VEHICLE

TECHNICAL FIELD

The present invention relates to vehicle suspension device or apparatus capable of controlling the posture of a vehicle body, and more specifically to a vehicle suspension device or apparatus arranged to control a camber angle by utilizing a tire lateral force acting on a tire.

BACKGROUND ART

As a suspension device to vary a camber angle by utilizing a tire lateral force, there has been proposed a suspension device, as recited in a Patent Document 1, capable of varying the camber angle independently of an up-down movement of a wheel. This suspension device is arranged so that an instantaneous rotation center of movement of a wheel in a camber angle direction is set at a position below a ground surface, and that, in the case of the application of a tire lateral force, this suspension device can provide a negative camber to an outer wheel on the outer side of a turn and a positive camber to an inner wheel on the inner side of the turn. When the instantaneous rotation center of movement in the camber angle direction is set at a position above the ground surface near the ground surface, the suspension device is arranged to control the camber angle with actuators or the like.

Patent Document 1: Published Japanese translation of PCT Application Publication No. 2003-528771.

DISCLOSURE OF INVENTION

Problem to be Solved by the Invention

The conventional suspension device capable of varying the camber angle of a wheel independently of the up-and-down movement of the wheel is a suspension structure having a layout newly provided with a link so as to set an instantaneous rotation center of movement of a wheel in the camber angle direction at a desired position.

When the instantaneous rotation center of movement in the camber angle direction is set at a position located away from the ground surface below the ground surface, the wheel moves in the camber angle direction about the instantaneous rotation of movement in the camber angle direction, and therefore the tire ground contact point moves laterally with the generation of the camber angle.

That is, when a tire lateral force acts in a state of steady driving of the vehicle, a wheel on the outer side of a turn inclines to a negative camber direction about the instantaneous rotation center of movement in the camber angle direction located away from the ground surface and a wheel on the inner side of the turn inclines to a positive camber direction about the instantaneous rotation center of movement in the camber angle direction located away from the ground surface. Therefore, the tire ground contact point moves instantaneously to the inner side of the turn at a speed. By this movement, a tire lateral force is produced in a direction to impede the turn, that is, the direction toward the outer side of the turn, and the response of the vehicle is deteriorated by the addition of the camber angle.

In order to reduce this lateral displacement of the tire ground contact point to zero, it is possible to set the instantaneous rotation center of movement in the camber angle direction at a position near the ground surface. The setting of the instantaneous rotation center of movement in the camber angle direction near the ground surface decreases the camber angle toward zero, and hence impairs the effect of the camber angle.

Accordingly, in order to control the camber angle to an adequate value, and at the same time to decrease the lateral displacement of the tire ground contact point, the suspension system requires actuators for controlling the camber angle and the lateral displacement of the tire ground contact point, respectively. However, the addition of such actuators increases the cost.

Therefore, the present invention is devised in view of these problems. An object of the invention is to provide a vehicle suspension device or apparatus capable of controlling the camber angle to an adequate value by utilizing a lateral force acting on a tire without impairing the effect of variation of the camber angle.

Means for Solution of the Problem

To achieve the above-mentioned object, a vehicle suspension device or apparatus according to the present invention comprises a link mechanism replaceable equivalently by first and second virtual links. The first virtual link is a virtual link which, when a lateral force acts at a tire ground contact point, inclines a wheel in a camber angle direction with respect to a vehicle body and in a direction increasing the lateral force, independently of displacement of the wheel in an up-and-down direction. The second virtual link is a virtual link which is connected virtually and rotatably between the first virtual link and the vehicle body and which is arranged to allow the wheel to move in the up-and-down direction with respect to the vehicle body in accordance with a load variation of the wheel in the up-and-down direction. A rotation center in the camber angle direction, of the wheel with respect to the vehicle body and a rotation center in the up-and-down direction, of the wheel with respect to the vehicle body are so arranged that, in a state in which the lateral force acts at the tire ground contact point, a displacement of the tire ground contact point due to a change in the position of the first virtual link is canceled by a displacement of the tire ground contact point due to a change in the position of the second virtual link.

Effect of the Invention

The vehicle suspension device according to the present invention is constructed to include the link mechanism replaceable equivalently by the first virtual link which, when a lateral force acts at a tire ground contact point, inclines the wheel in the camber angle direction with respect to the vehicle body and in the direction increasing the lateral force, independently of displacement of the wheel in the up-and-down direction, and the second virtual link which is connected virtually and rotatably between the first virtual link and the vehicle body and which is arranged to allow the wheel to move in the up-and-down direction with respect to the vehicle body in accordance with a load variation of the wheel in the up-and-down direction. The rotation center in the camber angle direction, of the wheel with respect to the vehicle body and the rotation center in the up-and-down direction, of the wheel with respect to the vehicle body are arranged so that, in the state in which the lateral force acts at the tire ground contact point, the displacement of the tire ground contact point due to a change in the position of the first virtual link is canceled by the displacement of the tire ground contact point due to a change in the position of the second virtual link. Therefore, the vehicle suspension device can adjust the camber angle in accordance with a lateral force while causing no displacement of the tire ground contact point or decreasing the displacement of the tire ground contact point.

BEST MODE(S) FOR CARRYING OUT THE INVENTION

Embodiments of the present invention will be explained hereinafter.

A first embodiment will be explained first.

Figure 1:
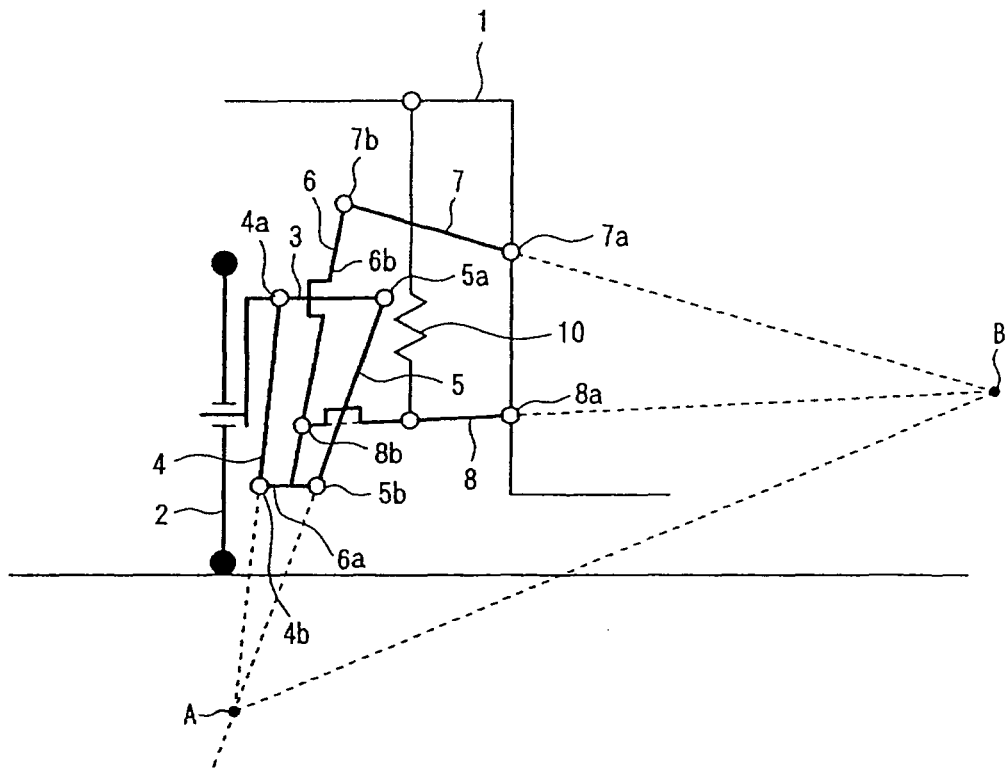
FIG. 1 is a schematic construction view showing a vehicle suspension device or apparatus in one example according to a first embodiment of the present invention.

FIG. 1 is a view as viewed from the rear of a vehicle body, for illustrating the principle of a suspension device or apparatus for a vehicle according to the present invention.

In FIG. 1, a vehicle includes a vehicle body 1 and a wheel 2. Wheel 2 is supported rotatably by a rotation support member 3. Upper end portions of links 4 and 5 are rotatably connected with this rotation support member 3 through rotational members 4a and 5a. Links 4 and 5 extend substantially in an up-and-down direction, and serve as up-and-down direction links. Lower end portions of links 4 and 5 are rotatably connected with a link 6 as an inverted-T-shaped link. This link 6 is shaped like an inverted T. The lower end portions of links 4 and 5 are connected, respectively, with both ends of a horizontal portion 6a of the link 6, rotatably through rotational members 4b and 5b. The horizontal portion 6a of link 6 extends substantially in a horizontal direction. Links 4 and 5 are arranged so that an intersection point of extensions of axes of links 4 and 5 is located below a ground surface.

Links 7 and 8 correspond to an upper link and a lower link, and extend, as vehicle widthwise direction links, laterally in a vehicle widthwise direction. Vehicle body's side end portions of links 7 and 8 are connected with a vehicle body 1, rotatably through rotational members 7a and 8a. A wheel's side end portion of link 7 is connected, rotatably through a rotational member 7b, with an end portion of a vertical portion 6b of link 6. This vertical portion 6b of link 6 extends substantially in a vertical direction. A wheel's side end portion of link 8 is connected, rotatably through a rotational member 8b, with vertical portion 6b of link 6 at a position closer to horizontal portion 6a. Links 7 and 8 are arranged so that an intersection point of extensions of axes of links 7 and 8 is located on an inner or inboard side in the vehicle widthwise direction.

A spring member 10 is connected rotatably between link 8 and vehicle body 1. Spring member 10 extends substantially in the up-and-down direction, and spring member 10 can support the weight of the vehicle body. Spring member 10 corresponds to a shock absorber or the like.

Thus, link 6 is supported so that link 6 can move in the up-and-down direction relative to vehicle body 1, in response to input of a force in the up-and-down direction from the road surface. Moreover, the above-mentioned rotation support member 3 is supported so that rotation support member 3 can move in a lateral direction relative to link 6 in response to input of a force in the lateral direction from the road surface. In this case, an instantaneous rotation center A of movement of rotation support member 3 in the lateral direction is located at the intersection point of extensions of the axes of links 4 and 5. An instantaneous rotation center B of movement of link 6 in the up-and-down direction is located at the intersection point of extensions of the axes of links 7 and 8.

Therefore, it is possible to consider geometrically that wheel 2 moves in the up-and-down direction relative to vehicle body 1 by input of a force in the up-and-down direction from the road surface, and moves in a camber angle direction relative to vehicle body 1 by input of a force in the lateral direction from the road surface. Moreover, it is possible to consider that an instantaneous rotation center B of wheel 2 in the up-and-down direction is located at the intersection point of extensions of the axes of links 7 and 8 (each of the extensions is a straight line connecting the connection points at both ends of link 7 or 8); and an instantaneous rotation center A of wheel 2 in the camber angle direction is located at the intersection point of extensions of the axes of links 4 and 5 (each of the extensions is a straight line connecting the connection points at both ends of link 4 or 5).

Figure 2:
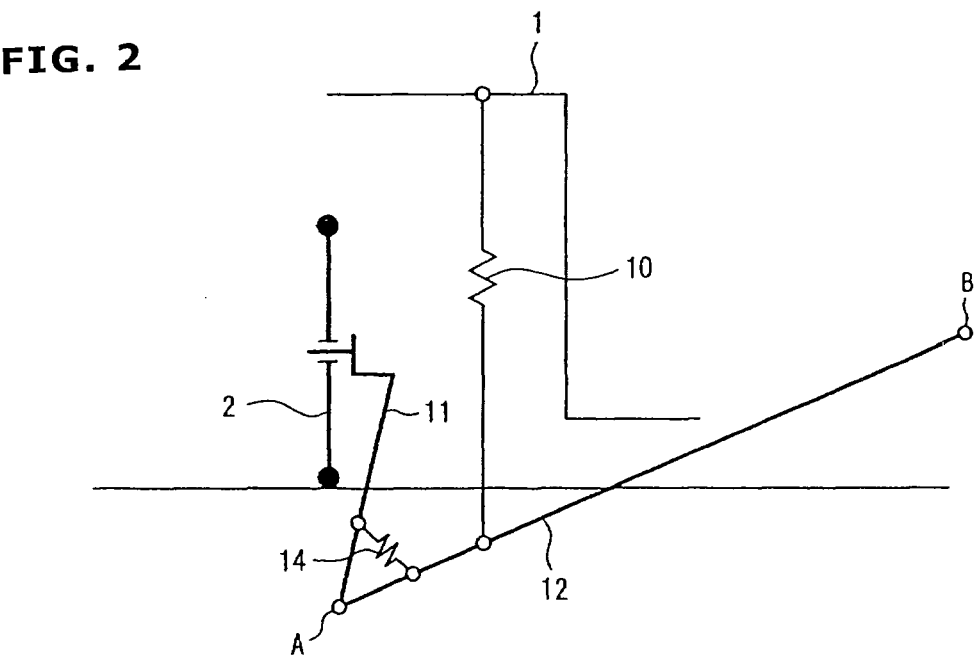
FIG. 2 is a view for illustrating a first virtual link and a second virtual link in the suspension device of FIG. 1.

Rotation support member 3 supports wheel 2 rotatably, and determines the instantaneous rotation center A in the camber angle direction together with link 4, link 5 and link 6. Therefore, it is possible to replace the rotation support member 3, links 4 and 5 and link 6 shown in FIG. 1, equivalently with a first virtual link 11 connecting the instantaneous rotation center A in the camber angle direction with wheel 2, as shown in FIG. 2. Furthermore, links 6, 7 and 8 determine the instantaneous rotation center B in the up-and-down direction, and it is possible to consider that links 7 and 8 are connected through link 6, with first virtual link 11. Therefore, it is possible to replace links 6, 7 and 8 with a second virtual link 12 which is connected virtually with first virtual link 11 at instantaneous rotation center A in the camber angle direction, and which virtually connects the instantaneous rotation center A in the camber angle direction with the instantaneous rotation center B in the up-and-down direction.

In FIG. 1, spring member 10 is connected with link 8. However, it is optional to connect spring member 10 with any one of suspension constituent components constituting second virtual link 12 determining the position of wheel 2 in the up-and-down direction.

Furthermore, in FIG. 2, a virtual spring 14 is provided between first and second virtual links 11 and 12. This virtual spring 14 corresponds to a factor which can be assumed to be formed by an overturning moment caused by displacement of the tire in the camber angle direction, the friction of the suspension links constituting first virtual link 11, and spring components of the rotational members. This virtual spring 14 is considered to be connected between first and second virtual links 11 and 12.

Explanation has been directed to the suspension of a double wishbone type as shown in FIG. 1 to illustrate the first and second virtual links 11 and 12. However, the present invention is not limited to this type. The present invention is applicable also to suspensions of a strut type, a multi-link type, and a trailing arm type, and suspensions of any type having a link structure which can be replaced by the first and second virtual links 11 and 12.

The following is explanation on a method for setting instantaneous rotation center A in the camber angle direction and instantaneous rotation center B in the up-and-down direction.

A camber angle control type suspension device of earlier technology is arranged to vary the camber angle when a tire lateral force is applied, as mentioned before. Therefore, this suspension device is considered to have the first virtual link 11 of FIG. 2, and arranged to determine the position of the instantaneous rotation center of first virtual link 11, that is, instantaneous rotation center A in the camber angle direction so as to add a camber angle with first virtual link 11.

Figure 3A:
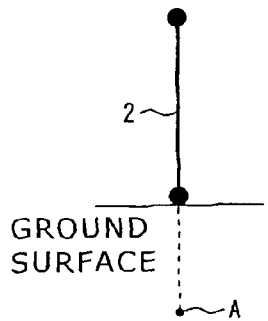
FIG. 3A is a view (R/View) in a steady state, for illustrating a force acting on a tire when a tire lateral force is applied.
Figure 3B:
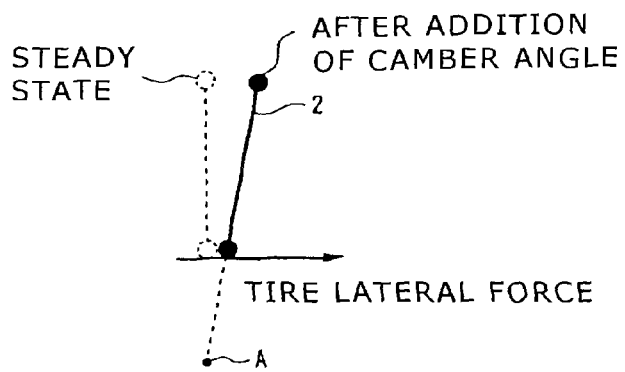
FIG. 3B is a view (R/View) for illustrating a force acting on a tire in the case of application of a tire lateral force, in a state of occurrence of a tire lateral force.
Figure 3C:
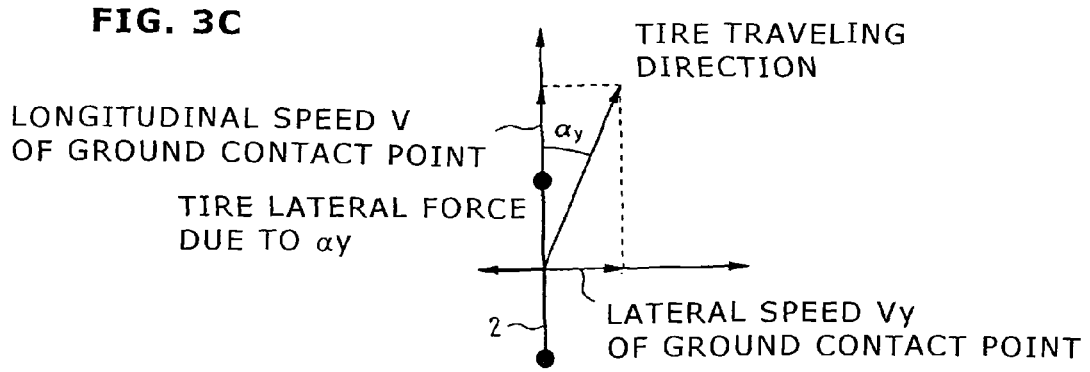
FIG. 3C is a view (P/View) for illustrating a force acting on a tire in the case of application of a tire lateral force, to show a tire lateral slip due to a shift of a ground contact point.

This suspension device can control the camber angle in accordance with a lateral force, as mentioned above. However, in this suspension device, the addition of the camber angle causes lateral movement of a tire ground contact point, and accordingly the response of the vehicle is deteriorated by the addition of the camber angle. In other words, when the instantaneous rotation center A of wheel 2 in the camber angle direction is set at a position below the ground surface, as shown in FIG. 3, in a steady state (FIG. 3A, rear view) in which the camber angle is not controlled, the wheel 2 rotates about the instantaneous rotation center A in the camber angle direction by the application of a lateral force on the tire, as shown in FIG. 3B (rear view). Accordingly, the tire ground contact point moves instantaneously toward the inner side of a turn or turning motion of the vehicle. Thus, the tire ground contact point moves toward the inner side of the vehicle turning motion at a speed Vy. As a result, an angle αy is formed between a longitudinal speed V of the center of the tire ground contact point and a tire traveling direction, and a tire lateral force is produced in a direction impeding the turning motion (FIG. 3C, plan view).

According to the first embodiment, therefore, the suspension device (or apparatus) adjusts a lateral movement amount Δyl1 which is an amount of lateral movement of the tire ground contact point due to variation of the camber angle by first virtual link 11, about instantaneous rotation center A in the camber angle direction, with a lateral movement amount Δyl2 which is an amount of lateral movement of the tire ground contact point caused by rotation of second virtual link 12 about instantaneous rotation center B in the up-and-down direction. By providing first virtual link 11 and second virtual link 12, as mentioned above, it is possible, in a passive suspension system, to set a camber angle variation of wheel 2 and a lateral displacement of the tire ground contact point on the occurrence of a tire lateral force, independently and arbitrarily.

Figure 4A:
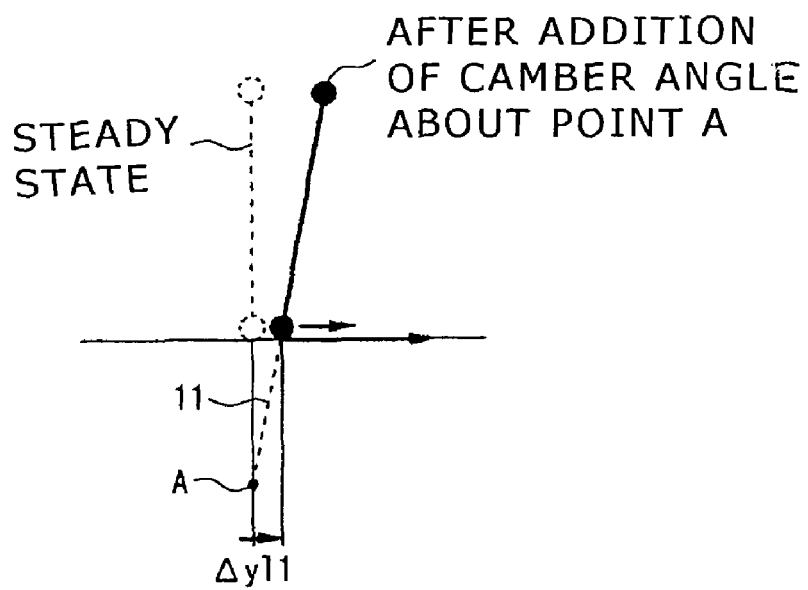
FIG. 4A is a view for illustrating operation of the first embodiment of the present invention, to show a lateral movement amount $\Delta yl1$.
Figure 4B:
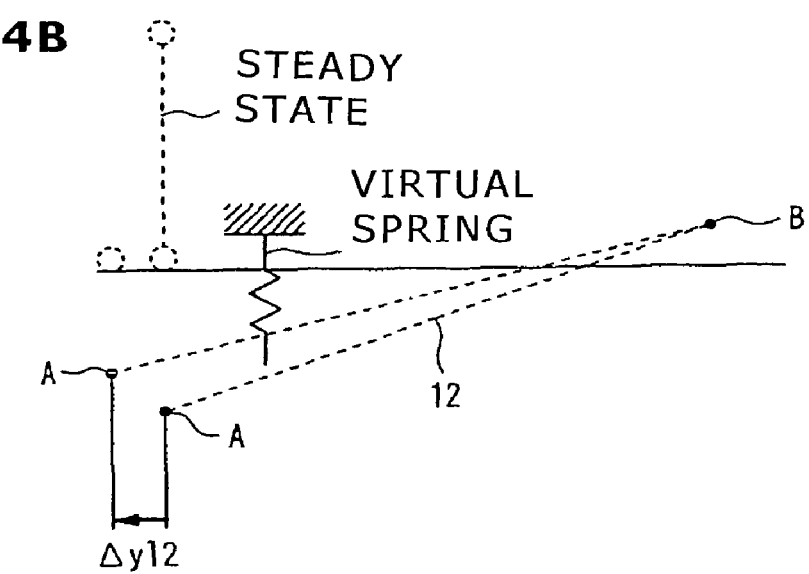
FIG. 4B is a view for illustrating operation of the first embodiment of the present invention, to show a lateral movement amount $\Delta yl2$.

When, as shown in FIG. 4A, the camber angle is varied by a tire lateral force, the first virtual link 11 rotates about instantaneous rotation center A in the camber angle direction, and wheel 2 rotates. Therefore, the tire ground contact point moves laterally by the amount Δyl1. On the other hand, the wheel load varies in association with the rotation of first virtual link 11 by the tire lateral force, and second virtual link 12 determining the position of the vehicle body in the up-and-down direction is rotated about instantaneous rotation center B in the up-and-down direction, in accordance with the wheel load variation. As a result, the tire ground contact point is moved laterally by the amount Δyl2 in the direction cancelling the lateral movement amount Δyl1.

The lateral movement amounts Δyl1 and Δyl2 of the tire ground contact point and the camber angle γ produced by rotation of first virtual link 11 and second virtual link 12 are expressed by the following equations.

$$\Delta yl1 = L1 \cdot \tan \gamma \tag{1}$$

$$\gamma = [-Fy \cdot L1 + (W + \Delta W) \cdot L3]/K\gamma \tag{2}$$

$$\Delta yl2 = -R[\cos \beta - \cos(\beta - \alpha)] \tag{3}$$

$$R = [(L4)^2 + (L2)^2]^{1/2} \tag{4}$$

$$\beta = \cos^{-1}[(L4)/(L2)] \tag{5}$$

$$\alpha = \beta + \sin^{-1}(\Delta Z/R - \sin \beta) \tag{6}$$

$$\Delta Z = R \cdot \sin[(\Delta W \cdot R \cdot \cos \beta - Fy \cdot R \cdot \cos \beta + K\gamma \cdot \gamma)/K\delta] \tag{7}$$

$$K\delta = Kw \cdot (R \cdot \cos \beta)^2 \tag{8}$$

$$\Delta W = f(Fy) \tag{9}$$

Figure 5A:
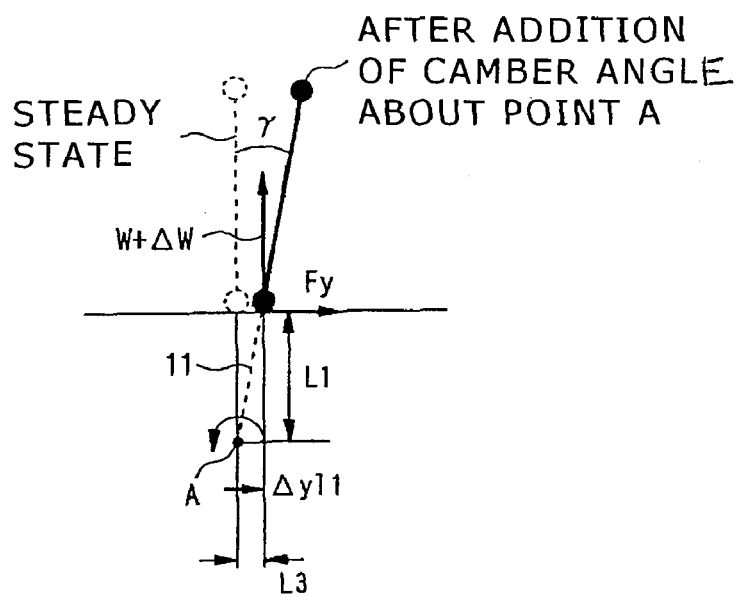
FIG. 5A is a view for illustrating a method of calculating the lateral movement amount $\Delta yl1$ of a tire ground contact point and a camber angle $\gamma$.
Figure 5B:
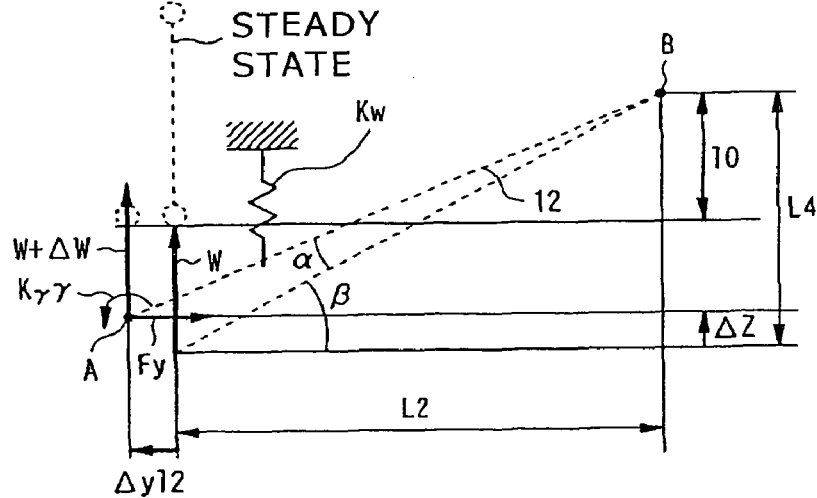
FIG. 5B is a view for illustrating a method of calculating the lateral movement amount $\Delta yl2$ of the tire ground contact point.

In these equations, L1~L4 are values defined as shown in FIG. 5. As shown in FIG. 5A, L1 is a vertical distance from instantaneous rotation center A of the camber angle to the tire ground contact point; and L3 is an amount of movement of the tire ground contact point caused by the addition of a camber angle about instantaneous rotation center A. As shown in FIG. 5B, L2 is a horizontal distance between instantaneous rotation center A and instantaneous rotation center B in the up-and-down direction in a state before movement of second virtual link 12, that is the steady state; and L4 is a vertical distance between instantaneous rotation center A and instantaneous rotation center B in the steady state.

Figure 6:
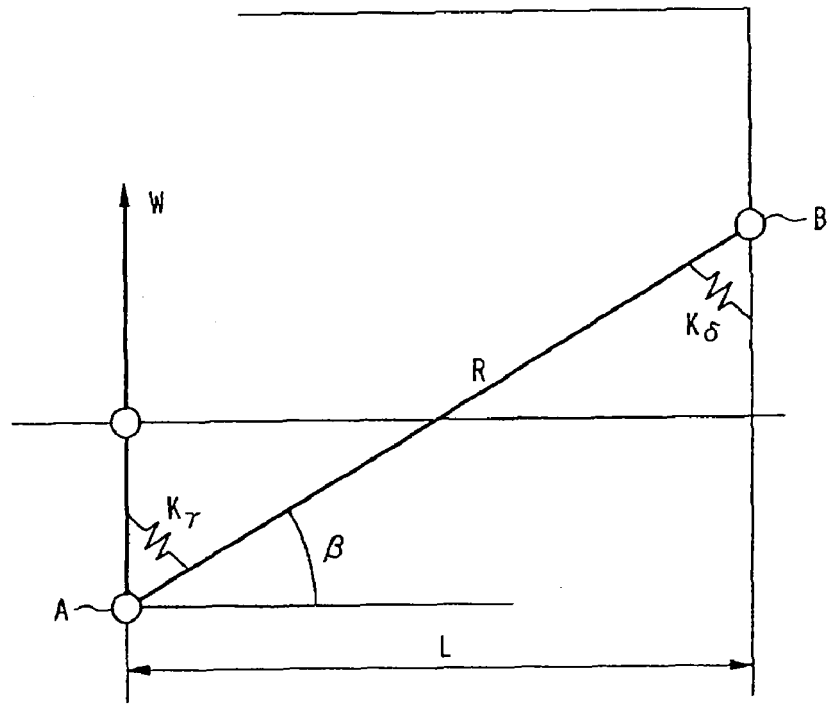
FIG. 6 is a view for illustrating a virtual spring $K\delta$.

In the before-mentioned equations, Fy is a lateral force at the tire ground contact point; W is a wheel load in the steady state; ΔW (delta W) is a wheel load variation from the steady state; Kγ is a stiffness or rigidity in the camber angle direction by first virtual link 11 such as overturning moment and bush stiffness; Kw is a virtual spring corresponding to a wheel end, provided in second virtual link 12; Kδ is a value corresponding to a spring formed by providing, in second virtual link 11 about instantaneous rotation center B, the virtual spring Kw provided in second virtual link 12, as a spring corresponding to the wheel end, as shown in FIG. 6; R is the length of second virtual link (i.e., the distance between instantaneous rotation centers A and B); β is an inclination angle of second virtual link 12; α is a variation of the inclination angle of second virtual link 12; and ΔZ is an up-down displacement of the tire ground contact point.

When a tire lateral force is inputted, the camber angle γ produced by first virtual link 11 can be expressed by equation (2) from the balance about moment of the tire ground contact point. The quantity $K\gamma$ is a value corresponding to a spring (corresponding to virtual spring 14 shown in FIG. 2) which acts, against a moment about instantaneous rotation center A, to prevent first virtual link 11 from producing a camber angle, an overturning moment of the tire and a repulsive force due to deformation of suspension members.

The lateral movement amount $\Delta y l1$ of the tire ground contact point produced by first virtual link 11 with the camber angle $\gamma$ produced by first virtual link 11 can be expressed by equation (1) from a geometrical relationship among the tire ground contact point, instantaneous rotation center A and camber angle $\gamma$.

The lateral movement amount $\Delta y l2$ of the tire ground contact point produced by second virtual link 12 is expressed by equation (3), and R, $\beta$ and $\alpha$ appearing in equation (3) are expressed, respectively, by equations (4), (5) and (6). Quantity $\Delta Z$ in equation (6) is expressed by the equation (7), and determined by the wheel load of the vehicle body, the lateral force acting on the tire and the moment produced about instantaneous rotation center A by first virtual link 11.

Wheel load variation $\Delta W$ can be expressed as a function of lateral force Fy acting on the tire, as a variable, as expressed by equation (9). Thus, the relationship exists between lateral force Fy acting on the tire and wheel load variation $\Delta W$ in a vehicle driving state. Therefore, from the position of the center of gravity of the vehicle body, the roll stiffness, the wheel load distribution, and the height of the roll center, it is possible to set the instantaneous rotation center B with respect to the instantaneous rotation center A so as to make the camber angle and the lateral displacement of the tire ground contact point equal to desired values in a given vehicle driving state.

That is, camber angle $\gamma$ produced by first virtual link 11 is determined by instantaneous rotation center A and stiffness $K\gamma$. The lateral displacement of the tire ground contact point is a sum of an amount of a lateral displacement of the tire ground contact point due to a camber angle variation by first virtual link 11, and an mount of a lateral displacement of the tire ground contact point due to rotation of second virtual link 11 about instantaneous rotation center B. Thus, a desired camber angle in a state quantity is determined by first virtual link 11, and by setting instantaneous rotation center B with respect to that characteristic, it is possible to adjust the variation of the camber angle and the lateral displacement of the tire ground contact point independently from each other.

According to the first embodiment, the instantaneous rotation center B is set with respect to instantaneous rotation center A so that lateral movement amount $\Delta y l2$ of the tire ground contact point by second virtual link 12 becomes greater than lateral movement amount $\Delta y l1$ of the tire ground contact point to the inner side of the turn caused by the inclination of first virtual link 11 in the camber angle direction. That is, the instantaneous rotation center B is so set that the lateral displacements of the tire ground contact point defined by equations (1) and (3) satisfy the condition of $|\Delta y l2| \geq |\Delta y l1|$.

Figure 7:
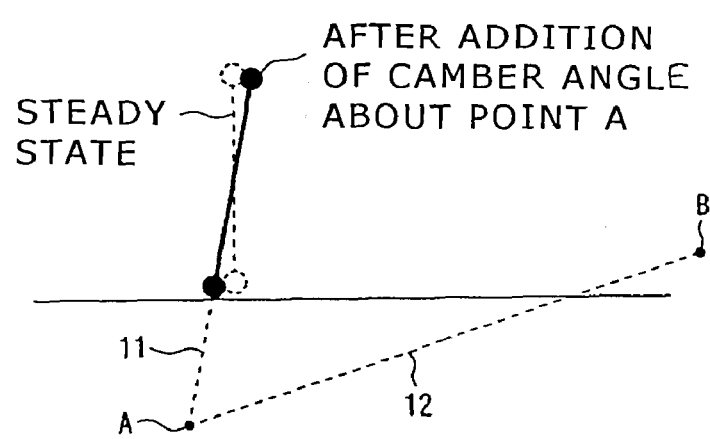
FIG. 7 is a view for illustrating the operation of the first embodiment.

By this setting, the tire ground contact point is moved to the outer side of the turn at least from the position in the steady state, as shown in FIG. 7. Therefore, this suspension system can achieve a desired camber angle, and at the same time prevent the vehicle response from being deteriorated by the addition of the camber angle, by preventing the tire ground contact point from moving to the inner side of the turn from the position in the steady state, and thereby preventing occurrence of a tire lateral force in a direction impeding the turn of the vehicle. As shown in FIG. 7, the tire ground contact point is moved to the outer side of the turn from the position in the steady state, and hence a tire lateral force is produced toward the inner side of the turn. Therefore, this suspension system can improve the response of the vehicle with respect to the addition of the camber angle.

The tire lateral force toward the inner side of the turn becomes greater as the lateral movement amount $\Delta y l2$ of the tire ground contact point by second virtual link 12 becomes greater than lateral movement amount $\Delta y l1$ of the tire ground contact point to the inner side of the turn caused by the inclination of first virtual link 11 in the camber angle direction. Therefore, the suspension system can further improve the vehicle response with respect to the addition of the camber angle.

Moreover, as expressed by equations (1)~(9), it is possible to define camber angle $\gamma$ produced by first virtual link 11, lateral movement amount $\Delta y l1$ of the tire ground contact point produced by first virtual link 11 and lateral movement amount $\Delta y l2$ of the tire ground contact point produced by second virtual link 12, and to determine these quantities numerically. Therefore, it is possible to readily determine the positions of instantaneous rotation centers A and B by calculating these positions so as to satisfy a predetermined relationship of lateral movement amounts $\Delta y l1$ and $\Delta y l2$; and to achieve the calculated positions readily without the need for an actuator or other addition device.

Further, this suspension system can control the camber angle and control the displacement of the tire ground contact point without using actuators or other devices. Thus, since the suspension system can adjust the camber angle without using actuators, it is possible to reduce the cost significantly by eliminating the need for providing an actuator for each wheel.

The following is explanation on a second embodiment of the present invention.

Figure 8:
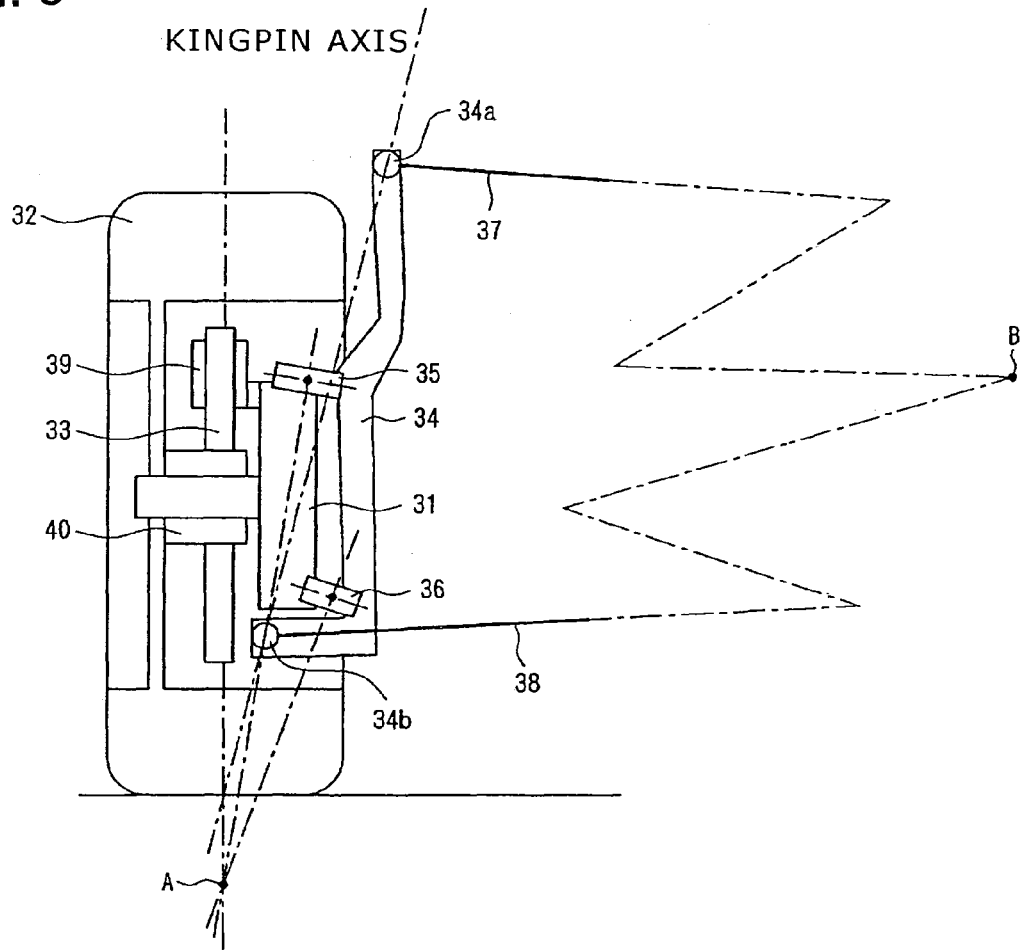
FIG. 8 is a schematic construction view showing a vehicle suspension device or apparatus in one example according to a second embodiment.

FIG. 8 is a schematic view showing the construction of a vehicle suspension device or apparatus in one example according to the second embodiment, as viewed from the rear of the vehicle.

As shown in FIG. 8, a wheel 32 and a brake rotor 33 are connected to a knuckle arm 31. A link 34 extending in the up-and-down direction is connected with this knuckle arm 31 through two bushes (elastic members) 35 and 36. An axial direction of each bush 35 or 36 is defined as a direction in which the bush is deformed. The bushes 35 and 36 are so arranged that an intersection point between an orthogonal axis which is an axis perpendicular to the axial direction of bush 35 and an orthogonal axis which is an axis perpendicular to the axial direction of bush 36 is located below the ground surface.

The upper and lower ends of the above-mentioned link 34 are connected, through pillow balls 34a and 34b, with ends of upper and lower links 37 and 38 extending in the vehicle widthwise direction. The other ends of upper and lower links 37 and 38 are connected rotatably with a vehicle body member not shown in the figure. Upper and lower links 37 and 38 are arranged so that an intersection point between extensions of upper and lower links 37 and 38 is located on an opposite wheel's side on the opposite side.

When a lateral force is applied to the tire, bushes 35 and 36 deform elastically, and thereby vary the camber angle of wheel 32. Upper and lower links 37 and 38 allow wheel 32 to move in the up-and-down direction. In FIG. 8, an item 39 is a brake caliper, and an item 40 is a wheel hub.

In this suspension system, the intersection point of the orthogonal axes perpendicular to the axial directions of bushes 35 and 36 serves as instantaneous rotation center A in the camber angle direction. The intersection point between the extensions of upper and lower links 37 and 38 serves as instantaneous rotation center B in the up-and-down direction.

In the second embodiment, knuckle arm 31 supports wheel 32 rotatably, and determines the instantaneous rotation center A in the camber angle direction together with bushes 35 and 36, and link 34. Therefore, bushes 35 and 36, link 34 and knuckle arm 31 can be replaced equivalently by first virtual link 11 connecting the instantaneous rotation center A in the camber angle direction and wheel 2. The instantaneous rotation center B in the up-and-down direction is determined by upper and lower links 37 and 38 and link 34, and upper and lower links 37 and 38 are connected with first virtual link 11 through link 34. Therefore, upper and lower links 37 and 38 and link 34 can be replaced by second virtual link 12 connected between instantaneous rotation center A in the camber angle direction and instantaneous rotation center B in the up-and-down direction as shown in FIG. 2.

By the application of a lateral force to wheel 32, bushes 35 and 36 in FIG. 8 deform, knuckle arm 31 rotates about instantaneous rotation center A, and the camber angle is varied. In this case, since the instantaneous rotation center A is set at the position below the ground surface, the tire ground contact point moves in the lateral direction. Accordingly, the instantaneous rotation center B in the up-and-down direction is so set as to prevent the lateral displacement of the tire ground contact point toward the inner side of the turn.

According to the second embodiment, the instantaneous rotation center B in the up-and-down direction is set with respect to instantaneous rotation center A in the camber angle direction so that lateral movement amount $\Delta y l1$ of the tire ground contact point to the inner side of the turn caused by the inclination of first virtual link 11 in the camber angle direction becomes substantially equal to lateral movement amount $\Delta y l2$ of the tire ground contact point by second virtual link 12 to the inner side of the turn. Specifically, the lateral movement amounts $\Delta y l1$ and $\Delta y l2$ of the tire ground contact point defined by equations (1) and (3) are so set that $|\Delta y l2|=|\Delta y l1|$. That is, instantaneous rotation centers A and B are set so as to satisfy the following equation (10).

$$R=|L1 \cdot \tan \gamma|/|\cos \alpha| \qquad (10)$$

Figure 9:
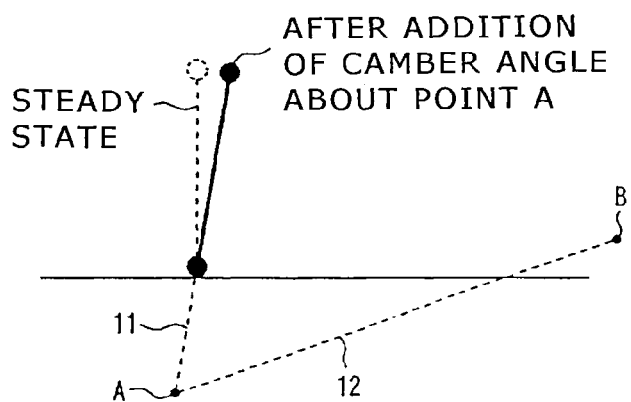
FIG. 9 is a view for illustrating the operation of the second embodiment.

Accordingly, even if the camber angle is varied by the application of a lateral force to wheel 32, the lateral movement amounts $\Delta y l1$ and $\Delta y l2$ cancel out each other. Therefore, as shown in FIG. 9, the lateral displacement of the tire ground contact point is approximately equal to zero. Thus, the suspension system can prevent a lateral force from being produced in the direction to impede the turn of the vehicle by a lateral displacement of the tire ground contact point, and thereby prevent the vehicle response from being deteriorated by the generation of such a lateral force.

Moreover, as compared to the arrangement in which first and second virtual links 11 and 12 are formed by using a link mechanism as explained in the first embodiment, the object can be achieved by a simple and uncostly structure using bushes 35 and 36. Furthermore, it is possible to reduce the weight.

In the second embodiment, the instantaneous rotation centers A and B are so set as to reduce the lateral displacement of the tire ground contact point approximately to zero, as shown in FIG. 9. However, the present invention is not limited to this arrangement. It is optional to employ the arrangement in which the instantaneous rotation center B is set with respect to instantaneous rotation center A so that lateral movement amount $\Delta y l2$ of the tire ground contact point by the rotation of second virtual link 12 becomes greater than lateral movement amount $\Delta y l1$ of the tire ground contact point by the rotation of first virtual link 11, and that the tire ground contact point moves to the outer side of the turn from the position in the steady state. In this case, wheel 32 receives a lateral force in the direction toward the inner side of the turn. Thus, the suspension system can improve the vehicle response against the addition of the camber angle.

In the illustrated example, the bushes are used as the elastic member. However, the present invention is not limited to this. It is possible to employ a member, such as a spring member, which can deform elastically.

The following is explanation on a third embodiment of the present invention.

The third embodiment is identical to the first embodiment except for the method for setting the instantaneous rotation centers A and B. Accordingly, the same parts are given the same reference numerals and detailed explanation on the same parts is omitted.

Figure 10:
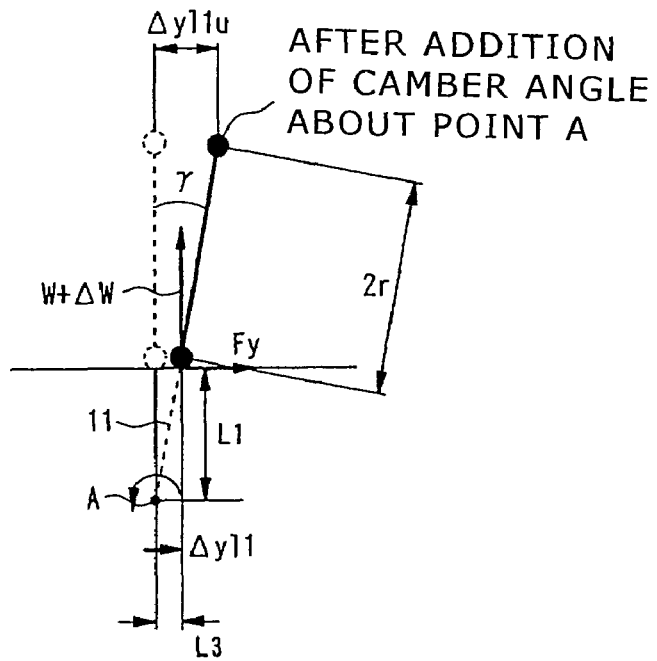
FIG. 10 is a view for illustrating a method of calculating a lateral movement amount $\Delta yl1u$ of an upper portion of a wheel.

In the third embodiment, as shown in FIG. 10, the instantaneous rotation center B is set with respect to instantaneous rotation center A so that a lateral movement amount $\Delta y l1 u$ of an upper portion of wheel 2 in the direction to the inner side of the turn caused by the inclination of first virtual link 11 in the camber angle direction becomes substantially equal to the lateral movement amount $\Delta y l2$ of the tire ground contact point by second virtual link 12.

That is, instantaneous rotation centers A and B are so set that the lateral movement amount $\Delta y l2$ of the tire ground contact point defined by equation (3) and the lateral movement amount $\Delta y l1 u$ of the upper portion of wheel 2 satisfy the condition that the absolute value of $\Delta y l2$ is substantially equal to the absolute value of $\Delta y l1 u$.

Lateral movement amount $\Delta y l1 u$ of the upper portion of wheel 2 can be expressed by the following equation (11).

$$\Delta y l1 u = L1 \cdot \tan \gamma + 2r \sin \gamma \qquad (11)$$

In equation (11), r is the radius of wheel 2.

Therefore, it is possible to achieve the condition of $|\Delta y l1 u| \approx |\Delta y l2|$, that is, the absolute value of $\Delta y l2$ is substantially equal to the absolute value of $\gamma y l1 u$, by setting the instantaneous rotation centers A and B so as to satisfy the following equation (12).

$$R=|L1 \cdot \tan \gamma + 2r \sin \gamma|/|\cos \alpha| \qquad (12)$$

Figure 11:
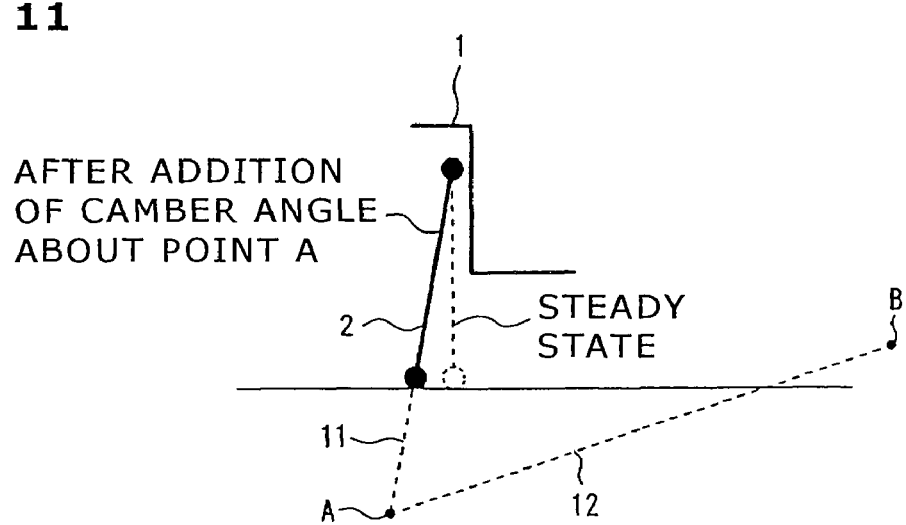
FIG. 11 is a view for illustrating the operation of a third embodiment.

By setting instantaneous rotation centers A and B so as to satisfy equation (12), as shown in FIG. 11, it is possible to prevent the tire ground contact point from being moved to the inner side of the turn by the variation of the camber angle, and to prevent the position of the upper portion of wheel 2 from being moved to the inner side of the turn. Therefore, the suspension system of the third embodiment can provide the effects as in the first embodiment, and further prevent a change of the position of the upper portion of wheel 2 as shown in FIG. 11.

When the upper position of wheel 2 is moved, a tire house clearance is varied by the change of the upper position of wheel 2 specifically in the case in which the upper position of wheel 2 is moved toward the vehicle body 1 in FIG. 11, so that a conventional vehicle body structure cannot be used in some cases. In the third embodiment, by contrast to this, instantaneous rotation centers A and B are so set as to prevent movement of the upper position of wheel 2. Therefore, the suspension system of the third embodiment can be applied to conventional vehicle body structures without problems.

The above explanation in the third embodiment is directed to the arrangement in which instantaneous rotation centers A and B are set so as to prevent movement of the upper position of wheel 2 to the inner side of the turn. However, the third embodiment is not limited to such an arrangement. The third embodiment is also applicable to the arrangement in which the upper position of wheel 2 is moved to the inner side of the turn as long as the tire house clearance is contained in an allowable range in spite of movement of the wheel upper position to the inner side.

In the above explanation, the third embodiment is applied to the structure of the first embodiment. However, it is possible to apply the third embodiment to the structure of the second embodiment.

According to the illustrated embodiments, a vehicle suspension device or apparatus includes at least a rotation support member to support a wheel of a vehicle rotatably; an intermediate member; a first adjusting mechanism arranged to connect the rotation support member with the intermediate member and to incline the wheel in a direction to vary a camber angle; and a second adjusting mechanism arranged to connect the intermediate member with a vehicle body, and to shift a tire ground contact point in a direction to cancel a lateral shift or lateral displacement of the tire ground contact point due to a change in the camber angle caused by the first adjusting mechanism. The vehicle suspension device may further includes a spring member which includes an upper end connected with the vehicle body and a lower end connected with one of the intermediate member and the second adjusting mechanism and which is arranged to support a vehicle body weight. In the illustrated examples, the first adjusting mechanism includes first and second connecting members connected between the support member and the intermediate member, and arranged to rotate the wheel in the direction to vary the camber angle; and the second adjusting mechanism includes an upper link extending from an outboard end connected with an upper portion of the intermediate member to an inboard end connected with an upper portion of a vehicle body member, and a lower link extending from an outboard end connected with a lower portion of the intermediate member to an inboard end connected with a lower portion of the vehicle body member. The lower link and upper link are arranged to allow the intermediate member to move up and down and to shift the tire contact point in the direction to cancel the lateral shift of the tire ground contact point due to a variation in the camber angle caused by the first and second connecting members.

Rotation support member 3 in the first embodiment or knuckle arm 31 can serve as the rotation support member. Link 6 in the first embodiment or link 34 of the second embodiment can serve as the intermediate member. Links 4 and 5 of the first embodiment or bushes 35 and 36 of the second embodiment can serve as the first and second connecting members.

The invention claimed is:

1. A vehicle suspension device comprising:
   a rotation support member to support a wheel rotatably;
   a pair of up-and-down direction links including upper end portions arranged in a pair in a vehicle widthwise direction and connected rotatably with the rotation support member, the up-and-down direction links being arranged so that an intersection point of extensions of axes of the up-and-down direction links in an up-and-down direction is located below a ground surface;
   an inverted-T-shaped link shaped in a form of an inverted letter T, and arranged so that lower end portions of the up-and-down direction links are connected rotatably with both end portions of a substantially horizontal member of the inverted-T-shaped link;
   a pair of vehicle widthwise direction links which extend in a vehicle widthwise direction, which are arranged in a pair in the up-and-down direction, which are rotatably connected between a substantially vertical member of the inverted-T-shaped link and a vehicle body member, and which are arranged so that an intersection point of extensions of axes of the vehicle widthwise direction links in the vehicle widthwise direction is located on an inner side in the vehicle widthwise direction; and
   a spring member which extends in the up-and-down direction, which is connected rotatably between the vehicle body member and one of the vehicle widthwise direction links and the horizontal member of the inverted-T-shaped link, and which is arranged to support a vehicle body weight.

2. A vehicle suspension device comprising:
   a rotation support member to support a wheel of a vehicle rotatably;
   an intermediate member;
   a first adjusting mechanism arranged to connect the rotation support member with the intermediate member and to incline the wheel in a direction to vary a camber angle; and
   a second adjusting mechanism arranged to connect the intermediate member with a vehicle body, and to shift a tire contact point in a direction to cancel a lateral shift of the tire contact point due to a variation in the camber angle caused by the first adjusting mechanism;
   wherein the first adjusting mechanism comprises:
      first and second connecting members connected between the rotation support member and the intermediate member, and arranged to rotate the wheel in the direction to vary the camber angle; and
   wherein the second adjusting mechanism comprises:
      an upper link extending from an outboard end connected with an upper portion of the intermediate member to an inboard end connected with an upper portion of a vehicle body member, and
      a lower link extending from an outboard end connected with a lower portion of the intermediate member to an inboard end connected with a lower portion of the vehicle body member, the lower link and the upper link being arranged to allow the intermediate member to move up and down and to shift the tire contact point in the direction to cancel the lateral shift of the tire contact point due to a variation in the camber angle caused by the first and second connecting members.

3. The vehicle suspension device as recited in claim 2, wherein the suspension device further comprises a spring member which includes an upper end connected with the vehicle body and a lower end connected with one of the intermediate member and the second adjusting mechanism, and which is arranged to support a vehicle body weight.

4. The vehicle suspension device as recited in claim 2, wherein the first adjusting mechanism is so arranged as to serve as a first virtual link which, when a lateral force acts at the tire contact point, inclines the wheel in the direction to vary the camber angle with respect to the vehicle body and in a direction increasing the lateral force, independently of displacement of the wheel in an up-and-down direction, and the second adjusting mechanism is so arranged as to serve as a second virtual link which is connected virtually and rotatably between the first virtual link and the vehicle body and which is arranged to allow the wheel to move in the up-and-down direction with respect to the vehicle body in accordance with a load variation of the wheel in the up-and-down direction;

wherein a rotation center of rotation in the direction to vary the camber angle of the wheel with respect to the vehicle body and a rotation center of rotation in the up-and-down direction of the wheel with respect to the vehicle body are arranged so that, in a state in which the lateral force acts at the tire contact point, a displacement of the tire contact point due to a change in a position of the first virtual link is canceled by a displacement of the tire contact point due to a change in a position of the second virtual link.

5. The vehicle suspension device as recited in claim 4, wherein the rotation center of rotation in the direction to vary the camber angle and the rotation center of rotation in the up-and-down direction are arranged so that, when the tire contact point moves to an inner side of a turn by the change of the position of the first virtual link, the displacement of the tire contact point caused by the change of the position of the second virtual link to an outer side of the turn becomes equal to or greater than the displacement of the tire contact point to the inner side of the turn caused by the change of the position of the first virtual link.

6. The vehicle suspension device as recited in claim 5, wherein, when the rotation center of rotation in the direction to vary the camber angle is located below a ground surface, and the rotation center of rotation in the up-and-down direction is located above the ground surface, on a side toward a wheel on an opposite lateral side, a lateral movement amount $\Delta yl1$ of the tire contact point due to the change of the position of the first virtual link, a lateral movement amount $\Delta yl2$ of the tire contact point due to the change of the position of the second virtual link, and a camber angle variation $\gamma$ are defined by following equations, and the rotation center of rotation in the direction to vary the camber angle and the rotation center of rotation in the up-and-down direction are arranged according to the equations;

$$\Delta yl1 = L1 \cdot \tan \gamma$$

$$\Delta yl2 = -R[\cos \beta - \cos(\beta - \alpha)]$$

$$\gamma = [-Fy \cdot L1 + (W + \Delta W) \cdot L3]/K\gamma$$

where R is a link length of the second virtual link, $\beta$ is an inclination angle of the second virtual link in a steady state, $\alpha$ is a variation of the inclination angle of the second virtual link from the steady state, L1 is a vertical distance from the rotation center of rotation in the direction to vary the camber angle to the ground surface, Fy is a lateral force acting at the tire contact point, W is a wheel load in the steady state, $\Delta W$ is a wheel load variation from the steady state, L3 is a displacement of the tire contact point from the steady state, and $K\gamma$ is a stiffness in the direction to vary the camber angle by the first virtual link.

7. The vehicle suspension device as recited in claim 5, wherein the first virtual link is arranged to vary the camber angle by using a rigidity of an elastic member.

8. The vehicle suspension device as recited in claim 4, wherein the rotation center of rotation in the direction to vary the camber angle and the rotation center of rotation in the up-and-down direction are arranged so that the displacement of the tire contact point to an inner side of the turn caused by the change of the position of the first virtual link and the displacement of the tire contact point to an outer side of the turn caused by the change of the position of the second virtual link are substantially equal to each other.

9. The vehicle suspension device as recited in claim 8, wherein, when the rotation center of rotation in the direction to vary the camber angle is located below a ground surface, and the rotation center of rotation in the up-and-down direction is located above the ground surface, on a side toward a wheel on an opposite lateral side, a lateral movement amount $\Delta yl1$ of the tire contact point due to the change of the position of the first virtual link, a lateral movement amount $\Delta yl2$ of the tire contact point due to the change of the position of the second virtual link, and a camber angle variation $\gamma$ are defined by following equations, and the rotation center of rotation in the direction to vary the camber angle and the rotation center of rotation in the up-and-down direction are arranged according to the equations;

$$\Delta yl1 = L1 \cdot \tan \gamma$$

$$\Delta yl2 = -R[\cos \beta - \cos(\beta - \alpha)]$$

$$\gamma = [-Fy \cdot L1 + (W + \Delta W) \cdot L3]/K\gamma$$

where R is a link length of the second virtual link, $\beta$ is an inclination angle of the second virtual link in a steady state, $\alpha$ is a variation of the inclination angle of the second virtual link from the steady state, L1 is a vertical distance from the rotation center of rotation in the direction to vary the camber angle to a ground surface, Fy is a lateral force acting at the tire contact point, W is a wheel load in the steady state, $\Delta W$ is a wheel load variation from the steady state, L3 is a displacement of the tire contact point from the steady state, and $K\gamma$ is a stiffness in the direction to vary the camber angle by the first virtual link.

10. The vehicle suspension device as recited in claim 8, wherein the first virtual link is arranged to vary the camber angle by using a rigidity of an elastic member.

11. The vehicle suspension device as recited in claim 4, wherein, when the rotation center of rotation in the direction to vary the camber angle is located below a ground surface, and the rotation center of rotation in the up-and-down direction is located above the ground surface, on a side toward a wheel on an opposite lateral side, a lateral movement amount $\Delta yl1$ of the tire contact point due to the change of the position of the first virtual link, a lateral movement amount $\Delta yl2$ of the tire contact point due to the change of the position of the second virtual link, and a camber angle variation $\gamma$ are defined by following equations, and the rotation center of rotation in the direction to vary the camber angle and the rotation center of rotation in the up-and-down direction are arranged according to the equations;

$$\Delta yl1 = L1 \cdot \tan \gamma$$

$$\Delta yl2 = -R[\cos \beta - \cos(\beta - \alpha)]$$

$$\gamma = [-Fy \cdot L1 + (W + \Delta W) \cdot L3]/K\gamma$$

where R is a link length of the second virtual link, $\beta$ is an inclination angle of the second virtual link in a steady state, $\alpha$ is a variation of the inclination angle of the second virtual link from the steady state, L1 is a vertical distance from the rotation center of rotation in the direction to vary the camber angle to the ground surface, Fy is a lateral force acting at the tire contact point, W is a wheel load in the steady state, $\Delta W$ is a wheel load variation from the steady state, L3 is a displacement of the tire contact point from the steady state, and $K\gamma$ is a stiffness in the direction to vary the camber angle by the first virtual link.

12. The vehicle suspension device as recited in claim 11, wherein, when the rotation center of rotation in the direction to vary the camber angle is located below the ground surface, and the rotation center of rotation in the up-and-down direction is located, above the ground surface, on the side toward the wheel on the opposite lateral side, a lateral movement amount $\Delta y l1u$ of an upper portion of the wheel due to the change of the position of the first virtual link, the lateral movement amount $\Delta yl2$ of the tire contact point due to the change of the position of the second virtual link, and the camber angle variation $\gamma$ are defined by following equations, and the rotation center of rotation in the direction to vary the camber angle and the rotation center of rotation in the up-and-down direction are arranged according to the equations;

$\Delta yl1 = L1 \cdot \tan \gamma + 2_r \cdot \sin \gamma$ $\Delta yl2 = -R[\cos \beta - \cos(\beta - \alpha)]$ $\gamma = [-Fy \cdot L1 + (W + \Delta W) \cdot L3]/K\gamma$ where R is the link length of the second virtual link, $\beta$ is the inclination angle of the second virtual link in the steady state, $\alpha$ is the variation of the inclination angle of the second virtual link from the steady state, L1 is the vertical distance from the rotation center of rotation in the direction to vary the camber angle to the ground surface, r is a radius of the wheel, Fy is the lateral force acting at the tire contact point, W is the wheel load in the steady state, $\Delta W$ is the wheel load variation from the steady state, L3 is the displacement of the tire contact point from the steady state, and $K\gamma$ is the stiffness in the direction to vary the camber angle by the first virtual link.

13. The vehicle suspension device as recited in claim 12, wherein the first virtual link is arranged to vary the camber angle by using a rigidity of an elastic member.

14. The vehicle suspension device as recited in claim 11, wherein the first virtual link is arranged to vary the camber angle by using a rigidity of an elastic member.

15. The vehicle suspension device as recited in claim 4, wherein the rotation center of rotation in the direction to vary the camber angle and the rotation center of rotation in the up-and-down direction are arranged so that a relative distance between an upper portion of the wheel and the vehicle body when the wheel is inclined to a vehicle body's side by the change of the position of the first virtual link is greater than or equal to a threshold value.

16. The vehicle suspension device as recited in claim 15, wherein the first virtual link is arranged to vary the camber angle by using a rigidity of an elastic member.

17. The vehicle suspension device as recited in claim 4, wherein the first virtual link is arranged to vary the camber angle by using a rigidity of an elastic member.

* * * * *